United States Patent [19]

Harris

[11] Patent Number: 4,542,768

[45] Date of Patent: Sep. 24, 1985

[54] PRESSURE RELIEF VALVE

[75] Inventor: Dwight E. Harris, Woodstock, N.Y.

[73] Assignee: Rotron, Inc., Woodstock, N.Y.

[21] Appl. No.: 588,756

[22] Filed: Mar. 12, 1984

[51] Int. Cl.$^4$ ............................................. F16K 15/14
[52] U.S. Cl. ................................ 137/856; 137/513.5;
137/857; 251/285
[58] Field of Search ............ 137/855, 856, 857, 512.15,
137/513.5, 516.11; 251/285

[56] References Cited

U.S. PATENT DOCUMENTS

| | | | |
|---|---|---|---|
| 1,124,203 | 1/1915 | Bingley . | |
| 2,001,885 | 5/1935 | Ohmart . | |
| 2,093,295 | 9/1937 | Teeter | 137/857 X |
| 2,151,746 | 3/1939 | Cody . | |
| 2,332,992 | 10/1943 | Davis | 137/857 X |
| 2,420,370 | 5/1947 | Hamilton | 251/285 X |
| 2,563,200 | 8/1951 | Venning . | |
| 2,598,216 | 5/1952 | Bousky | 137/856 |
| 2,599,499 | 6/1952 | Thorstenson | 137/856 X |
| 2,798,505 | 7/1957 | Kehler | 137/516.11 |
| 3,395,853 | 8/1968 | Zoehfeld . | |
| 3,931,830 | 1/1976 | Gritz . | |
| 4,173,985 | 11/1979 | Kirpichenkov | 137/855 X |
| 4,228,770 | 10/1980 | Boyesen . | |

FOREIGN PATENT DOCUMENTS

| | | | |
|---|---|---|---|
| 469291 | 11/1950 | Canada | 137/513.5 |
| 1159124 | 12/1963 | Fed. Rep. of Germany | 137/513.5 |
| 97971 | 6/1982 | Japan | 137/855 |
| 672884 | 5/1952 | United Kingdom . | |

Primary Examiner—Robert G. Nilson
Attorney, Agent, or Firm—Brumbaugh, Graves, Donohue & Raymond

[57] ABSTRACT

A pressure relief valve particularly suitable for fluid compressors includes a valve seat and a flexible valve closure element cooperating therewith. The closure element, formed from a single sheet of spring steel or similar flexible material, includes a planar portion normally overlying the valve seat to keep the valve closed, and a pair of flexible arms joined at one edge of the planar portion and extending around either side of the planar portion and beyond the opposite edge. In position, the remote ends of the arms are fastened to the supporting structure in a plane common with the valve seat, with the planar portion overlaying the valve seat and closing the valve orifice. Upon application of fluid pressure from the valve orifice to the underside of the planar portion of the valve closure, the planar portion lifts off the valve seat and the combined flexing of the planar portion with respect to the valve arms and the arms with respect to the supporting surface enable the planar portion to lift off the opening perpendicular to the direction of flow of fluid and parallel to the valve seat without additional valve guides. This provides maximum fluid flow for the amount of opening and reliable and long-lived operation. In a practical embodiment, the valve seat is provided by the end face of a tubular section forming the orifice to minimize pressure drop across the valve and the seat is notched to permit by-pass flow to occur with the valve in the closed position to facilitate opening of the valve. Spring means, which may be adjustable, are provided to control the pressure required to open the valve and limit stop means restrict the maximum opening of the valve closure to establish a maximum pressure for the compressor with which it is used and to prevent vibration of the valve closure.

6 Claims, 8 Drawing Figures

4,542,768

PRESSURE RELIEF VALVE

FIELD OF THE INVENTION

This invention relates to pressure relief valves for fluid compressors and the like and, more particularly, to such valves having low mass, flexible valve closure members which permit more precise pressure control and reliable, chatter-free operation.

BACKGROUND OF THE INVENTION

Fluid compressors find a wide range of applications in industrial and commercial environments, from control of manufacturing processes to inflation of bubble-type enclosures such as for tennis courts, protective housings for antennas, etc. Each such application requires a particular value or range of values of pressure (or vacuum) to fulfill its intended function. These values can be obtained by appropriate choice of the size of the compressor, control of the speed at which it is driven, use of fluid flow control arrangements, etc. By way of example, a form of the last mentioned type of control is disclosed in U.S. Pat. No. 3,395,853, granted Aug. 6, 1968 to Gunther Zoehfeld, and assigned to the present assignee.

Another way to establish a desired set of operating conditions for a fluid compressor is to provide a relief valve in the high pressure side of the compressor, which valve is designed to open at pressures above a predetermined value, thereby establishing the operating pressure of the compressor at that value. While the employment of relief valves in compressor systems is known, conventional pressure relief valves suffer from certain disadvantages which limit their effectiveness. The moving member of such a conventional valve, a ball, for example, requires a guide for confining the movement of the member, which guide may bind the member or prevent proper seating because of contamination or distortion of the material of the valve itself and thereby impair operation of the valve. Moreover, such a valve often is characterized by a moving member of relatively high mass, which results in a tendency of the member to chatter and change calibration at varying altitudes. These limitations render such valves unacceptable in many applications, particularly where the compressor is being used at an unattended location and high reliability is required.

SUMMARY OF THE INVENTION

The present invention avoids the disadvantages of prior relief valves by providing such a valve with a low-mass flexible valve closure element which functions both as the valve closure and as the guide for the closure. The closure element is constructed and mounted so as to move perpendicularly to the axis of the valve orifice and to remain parallel to the valve seat, thus providing maximum flow relative to the opening distance.

The basic valve of the invention comprises a valve seat surrounding an orifice communicating with the high pressure side of a compressor, and a valve closure element including a planar portion which normally rests on the valve seat to close the orifice to fluid flow. In the closed position, the valve closure element, including the planar portion, lies in a plane perpendicular to the direction of fluid flow through the orifice. When the fluid pressure at the orifice exceeds a predetermined value, the planar portion of the closure member lifts off the valve seat in a direction perpendicular to the fluid flow and parallel to the plane of the valve seat. Thus, fluid flow occurs completely around the periphery of the orifice to provide maximum fluid flow for the opening distance.

The valve closure element is formed of spring-like material, the resilience of which normally maintains it in a closed position against the valve seat. Preferably, however, additional spring means are mounted above the planar portion of the valve closure element to provide a further adjustable force which must be overcome before the valve opens. In addition, stop means may be provided to limit the extent to which the planar portion may lift from the valve seat, thereby controlling the maximum pressure of the compressor with which it is used and also increasing the stability of the valve function. In a preferred embodiment, the valve seat comprises the edge of a tubular member extending from the orifice communicating with the high pressure side of the compressor, the edge having one or more notches providing a fixed fluid by-pass to enhance operation of the valve.

The unique construction of the invention not only is simple and inexpensive to fabricate but provides a reliable, trouble-free valve suitable for use on compressors in applications in remote and unattended locations.

BRIEF DESCRIPTION OF THE DRAWINGS

The foregoing and other objects, features and advantages of the invention will become more apparent from the following detailed description thereof when taken in conjunction with the appended drawings in which.

DETAILED DESCRIPTION OF THE INVENTION

Figure 1:
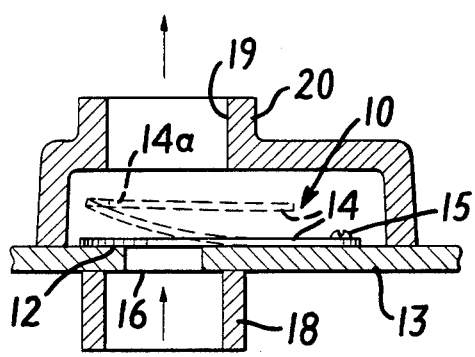
FIG. 1 is a cross-sectional view of a basic valve according to the present invention.
Figure 2:
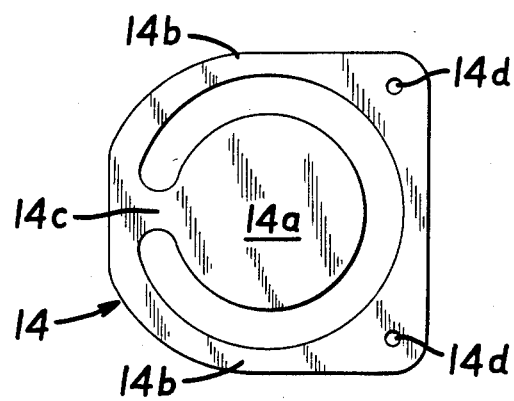
FIGS. 2 and 3 illustrate two different forms of valve closure elements of the present invention.
Figure 3:
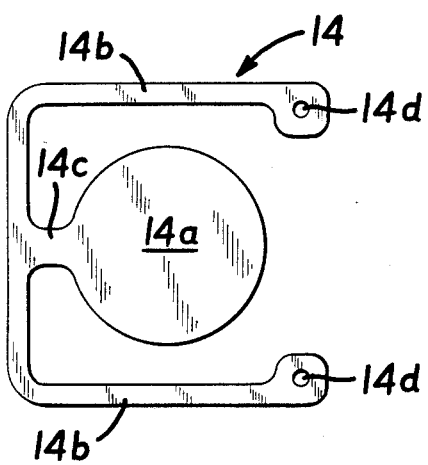

The basic valve construction in accordance with the invention is shown in FIG. 1. The valve, indicated generally at 10, comprises the valve seat 12, which in this case is the periphery of the orifice 16 in the base plate 13, and the valve closure element 14. The closure element, two embodiments of which are illustrated in FIGS. 2 and 3, is fastened at one end to the base plate 13 by means of screws 15 or the like and normally lies flat on the valve seat 12 to close the opening 16, as shown in solid line in FIG. 1. When fluid pressure in the duct 18 (and at the orifice 16) exceeds a predetermined value, a planar portion 14a of the closure element 14 lifts off the seat, allowing fluid to flow, in the direction of the lower arrow, into the housing 20 and out of the opening 19 at the top.

As indicated by the dotted line position of the valve closure element 14 in FIG. 1, and with reference to FIGS. 2 and 3, the closure element includes a planar portion 14a which normally overlays the valve seat 12 to close the orifice 16. When the fluid pressure in the orifice 16 exceeds some predetermined value, in this case determined by the spring value of the material of element 14, the planar portion 14a begins to rise off the valve seat in a direction perpendicular to the flow of air through the orifice and, thus, as shown in FIG. 1, parallel to the plane of the valve seat. The resultant opening to fluid flow is thereby substantially equal around the valve seat 12, thereby providing maximum fluid flow for the extent of displacement of the planar portion 14a from the valve seat and thus, efficient relief of pressure.

The manner by which the parallel opening of the planar portion 14a of the valve closure element is effected will be understood by reference to FIGS. 2 and 3 which illustrate two forms of the valve closure element 14. Preferably, the valve closure element 14 is stamped or otherwise cut from a thin sheet of spring steel or other similarly impermeable, flexible material. The closure element includes a planar portion 14a shaped and sized to fit the valve seat 12 with which it is associated and thus to close the orifice 16, and a pair of arms 14b extending on either side of the planar portion from a juncture therewith at one edge at flexible neck portion 14c. The ends of the arms 14b on the side of the planar portion opposite the juncture 14c are provided with holes 14d for fastening to the support means, such as by screws 15 (FIG. 1).

In operation, the fluid pressure against the underside of the planar portion 14a tends to lift that portion off the valve seat upon which it rests and, since the valve seat is arranged to lie in a plane perpendicular to the direction of fluid flow, the lifting of the planar portion 14a will tend to be in the direction of the air flow, i.e., perpendicular to the valve seat plane. The planar portion 14a is maintained in a plane parallel to the plane of the valve seat as a result of the complementary upward flexing of the arms 14b with respect to the support surface and of the planar portion 14a with respect to the arms. Thus, as illustrated in FIG. 1, the arms 14b bend upwardly from the valve seat 12 from their points of connection to the base plate 13 and the planar portion 14a bends upwardly with respect to the arms at the flexible juncture therewith, 14c. The dual flexing insures lifting of the planar portion 14a parallel to the valve seat without any exterior guides or connected members which would add to the complexity of the valve and adversely affect its reliability.

Figure 4:
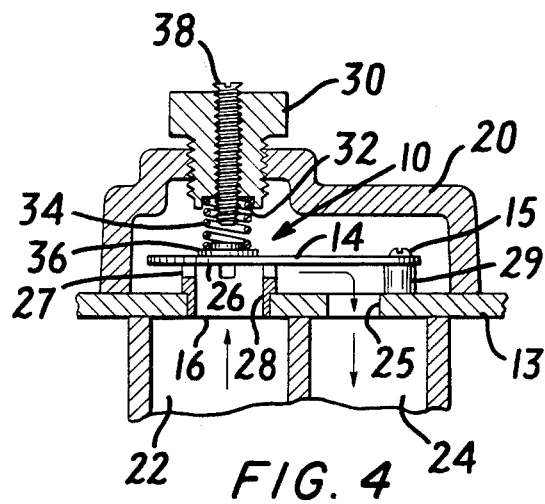
FIG. 4 is a cross-sectional view of another embodiment of the valve of the present invention, including pressure control means and a limit stop for the valve closure element.

In the embodiment shown in FIG. 1, the threshold pressure at which the valve is opened is determined by the spring factor of the material of the valve closure element 14. While this may be adequate in certain low pressure applications, the resistance to flexing of materials suitable for the valve closure element is insufficient when the valve is employed in a typical compressor environment. For such use, the embodiment of FIG. 4 is particularly suitable. In FIG. 4, the valve 10 is contained within the housing 20 mounted on the base plate 13 which may be a portion of the outer housing of a fluid compressor. Ducts 22 and 24 communicate directly with the high and low pressure sides; respectively, of the compressor, preferably adjacent the input and output ports of the compressor.

In the embodiment of FIG. 4, the valve 10 includes the closure element 14, of the type illustrated in FIGS. 2 and 3, and a valve seat 26. The latter is provided by a tubular extension 28 projecting upwardly from the orifice 16, the upper edge forming the seat 26. Spacers 29, to which the valve closure 14 is secured by screws 15, are of the same height as the projection of the tubular member 28 above the plane of the base plate 13, thereby insuring that the valve closure element, in the closed position, remains flat on the valve seat and parallel to the base plate 13. Preferably, the valve seat 26 includes one or more angularly spaced notches 27 which provide fluid by-pass means and improve operation of the valve, as will be discussed more fully hereinafter.

An opening 25 in the base plate 13 communicates with the duct 24 to permit fluid flow from the high pressure side through the valve 10, when open, to return the fluid to the system.

Knob-like member 30, threadedly engaging the upper wall of the housing 20 opposite the planar portion 14a of the valve closure element, is axially aligned with the center of the orifice 16 and includes a cup-shaped depression 32 at its lower end for engaging the upper turn of a coil spring 34. The bottom turn of the spring 34 in turn engages the upper surface of a disc member 36 whose lower surface bears against the upper surface of the planar portion 14a. The spring 34 and disc 36 exert a force on the planar portion 14a, tending to retain it against the valve seat 26. The magnitude of the retaining force establishes the threshold pressure at which the valve will open. Tightening the threaded member 30 to further compress the spring will increase the threshold pressure and loosening the member 30 will decrease the threshold pressure.

Arranged axially of the threaded member 30 is a further threaded member 38 which extends entirely through the member 30 to a point within the spring 34. Threaded member 38 provides a limit stop for upward movement of the planar portion 14a of the valve closure element. As will be seen, when the planar portion lifts off the valve seat a distance such that the pad 36 engages the lower end of the member 38, further elevation of the planar portion is prevented.

Figure 5:
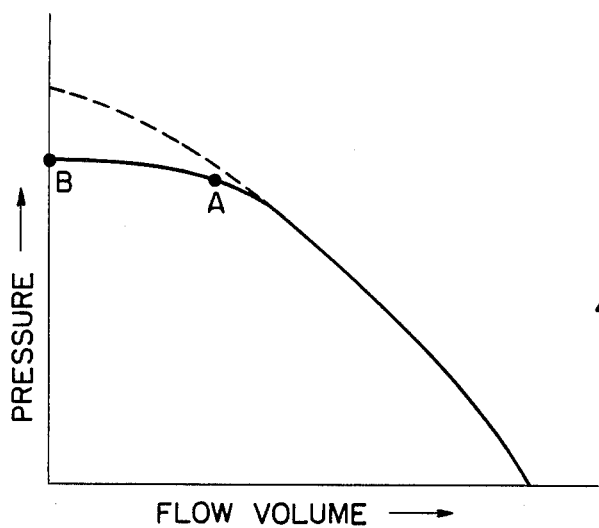
FIG. 5 is a graph of Pressure versus Flow Volume useful in explaining the operation of the valve of the invention.

Adjustment of threaded members 30 and 38 serve to establish operating points for the compressor with which the valve structure is associated. With reference to FIG. 5, which is a Pressure versus Flow Volume curve for a typical compressor, the compressor operating point A is established by the coil spring force exerted against the valve closure, as established by the position of the member 30. The shutoff pressure of the compressor, is established by the position of the limit stop member 38, point B on the curve of FIG. 5.

The orifice extension and limit stop elements of the embodiment of FIG. 4 improve the overall operation of the basic valve structure. With the valve seat located atop the tubular extension 28, thereby providing a projecting orifice, pressure drop across the valve, when open, is decreased and the effect of the velocity of fluid flow on the valve closure element also is reduced. The notches or slots 27, by providing by-pass flow in the closed position of the valve, alleviate the undesirable effects of an abrupt opening of the valve which would cause undue stress on the valve elements and undesirable fluctuations in the operating pressure of the compressor. The limit stop 38, in addition to controlling the maximum pressure of the compressor, serves the additional function of preventing vibration or chattering of the valve closure member.

Figure 6:
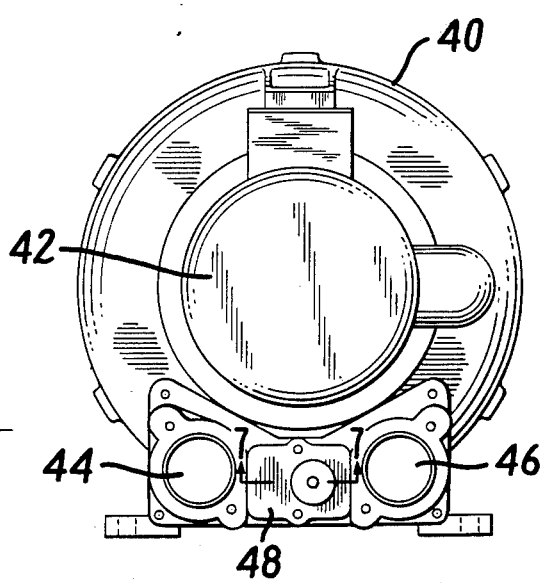
FIG. 6 is an end view of a commercially available compressor showing installation of the valve according to the invention.
Figure 7:
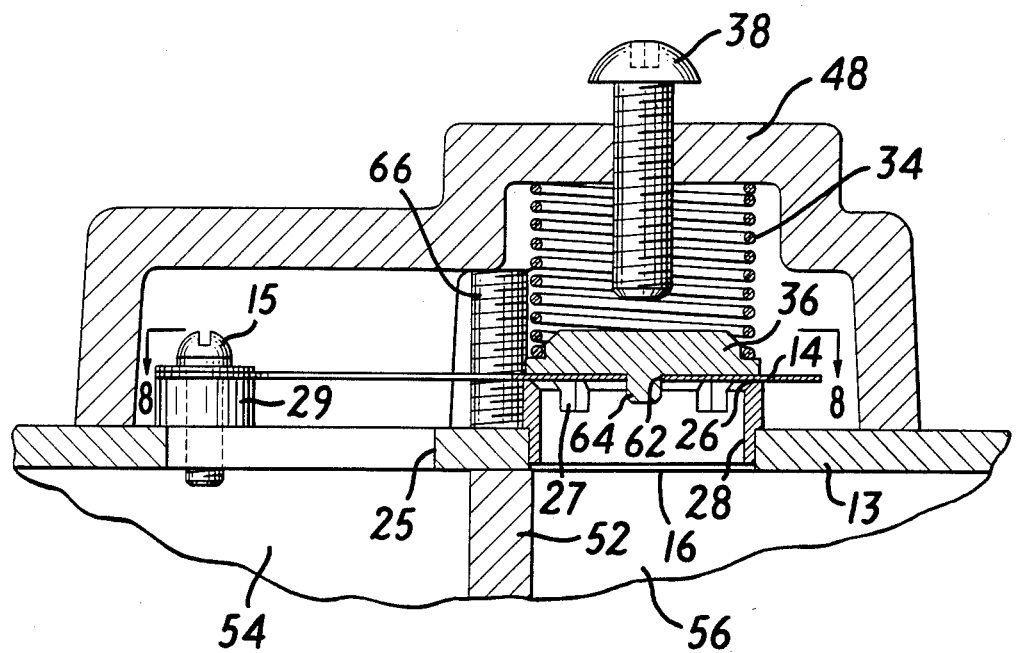
FIG. 7 is a partial cross-sectional view taken along the line 7—7 of FIG. 6 showing the internal construction of another embodiment of the valve of the invention, adapted for use with the compressor of FIG. 6.
Figure 8:
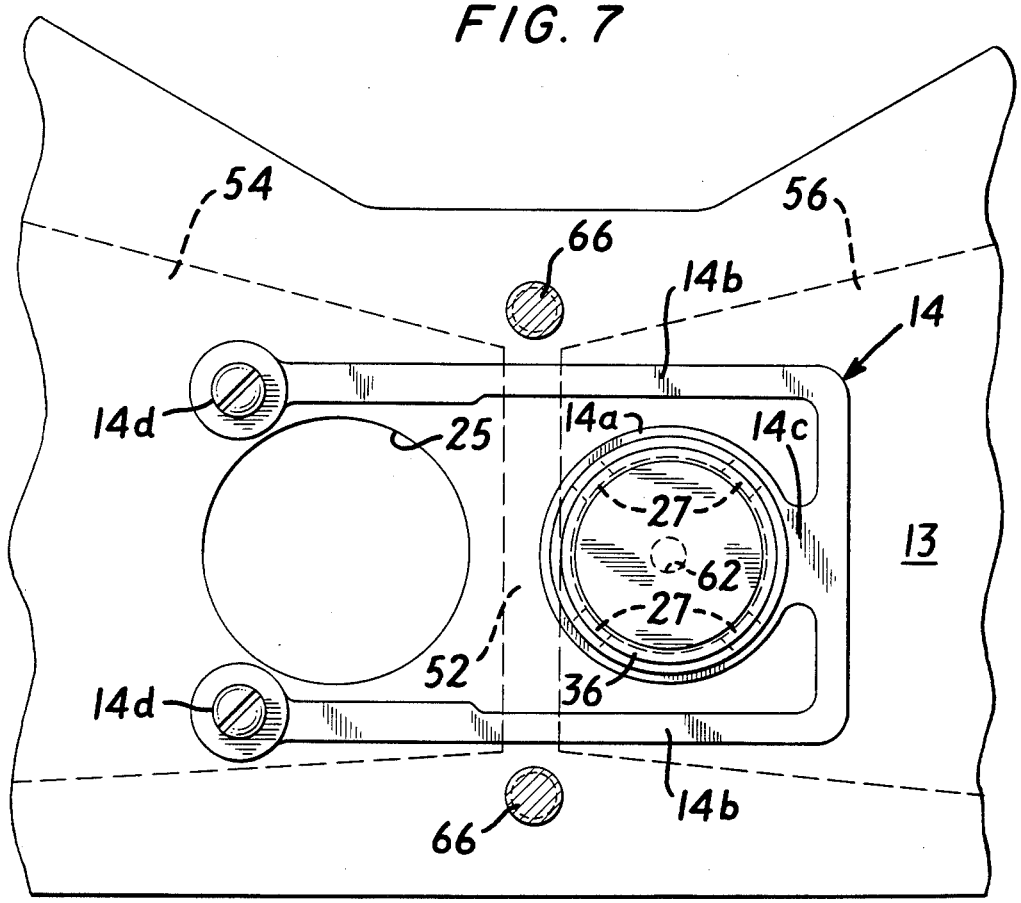
FIG. 8 is a plan view of the valve construction of FIG. 7 taken along the lines 8—8, illustrating the shape of the valve closure element.

FIGS. 6, 7 and 8 illustrate an application of the valve of the invention as incorporated in a commercial blower marketed by the applicant's assignee under the designation "Rotron DR404 type blower". This blower is of regenerative type with the impeller rotating within the generally toroidal housing 40 and being driven by motor 42, as seen in the end view of FIG. 6. The inlet port for the compressor or blower is indicated at 44 and the outlet, i.e., high pressure, port at 46. The relief valve 48 of the invention is mounted on the outlet plate of the unit between the ports 44, 46.

Turning to FIGS. 7 and 8, the internal structure of the valve 48 is shown. In FIG. 7, the reference numerals 54, 56 denote the input and output plena of the compressor separated by the septum 52. Inlet and outlet ports 44 and 46 communicate directly with the plena 54 and 56 respectively and provide coupling means between the vacuum and high pressure sides of the compressor and the external equipment.

The construction of the valve of FIGS. 7 and 8 is essentially the same as that of the embodiment of FIG. 4 and like reference numerals denote similar parts, although some minor variations in shape are required in some of the parts to adapt to the particular configuration.

The tubular orifice extension 28 provides a valve seat at its upper edge having notches 27 (see FIG. 8) to provide the by-pass flow described above. The valve closure element 14 is of a form similar to that illustrated in FIG. 3 with the addition of a central opening 62 which is engaged by a corresponding boss 64 on the lower surface of the disc 36, the purpose of which is to enable ready centering of the disc on the planar portion 14a of the valve closure element.

In the embodiment of FIGS. 7 and 8, the threaded member 38 serves as the limit stop for upward movement of the planar portion 14a. No separate adjusting means for the tension of the spring 34 is provided, since for use in a particular application, a single predetermined value of operating pressure can be provided by selecting a spring with the necessary stiffness. Should it become necessary to change the value of operating pressure, a different spring of suitable stiffness would be inserted to replace the existing spring. As indicated by the reference numerals 66, the housing 48 of the valve assembly is fastened to the base plate 13 by means of bolts 66 which may be readily removed to permit access to the valve structure.

The valve of FIGS. 6, 7 and 8 functions in the same manner as described in connection with the embodiment of FIG. 4. When the pressure in the high pressure side of the compressor 40 exceeds the preset value established by the stiffness of the spring 34, the planar portion of the valve closure element lifts, parallel to the valve seat 26, to relieve excess pressure and maintain the function of the compressor at its appropriate operating point. The fluid discharged through the open valve is returned through orifice 25 to the low pressure, or vacuum, side of the compressor to maintain the system closed. The limit stop 38 establishes the maximum pressure and prevents undesirable vibration of the valve closure.

As will be apparent, the valve of the invention is of simple, trouble free construction involving a minimum of moving parts which reduces the deleterious effects of dirt and is virtually free of misalignment problems. The unique construction of the seat and closure combination assures reliable and efficient operation of the valve requiring no attention and insuring long life. Thus, the construction is particularly suitable for applications in remote unattended facilities where reliability and long life are necessary.

Although particular embodiments of the invention have been described herein, it will be apparent to those skilled in the art that various modifications and variations of the structure disclosed may be devised and the scope of the invention is to be limited only by the appended claims.

I claim:

1. A pressure relief valve for use in a fluid compressor having a valve housing with inlet and outlet ports, comprising:
   a cavity within said valve housing communicating with an inlet port and an outlet port of said fluid compressor;
   a tubular member defining an orifice communicating with said cavity and said outlet port, one end of said member constituting a valve seat within the cavity, said valve seat lying in a plane perpendicular to the direction of fluid flow through the orifice;
   valve closure means including a planar portion normally overlaying and engaging the valve seat to close said orifice to fluid flow, said valve closure means being formed of a thin, flexible spring material responsive to fluid pressure at said orifice above a predetermined value to separate from the valve seat while remaining substantially parallel to the plane of the valve seat;
   said valve closure means further comprising flexible support means joined to the planar portion of said valve closure means along an edge thereof and having arms extending from the juncture along either side of said planar portion and beyond said portion, means securing the ends of said arms remote from said juncture to said valve housing to maintain said planar portion and said arms of said valve closure means coplanar with each other and said valve seat in the closed position of said valve, said planar portion and said support means being integrally formed of a thin, flexible spring material, whereby said support means bias said planar portion normally to be overlaying and engaging the valve seat, and upon opening of the valve in response to fluid pressure, to flex and maintain the planar portion substantially parallel to the plane of the valve seat;
   spring means for adjusting the predetermined value of fluid pressure at which said planar portion separates from the valve seat; and
   stop means for adjusting the maximum distance said planar portion may move from the valve seat.

2. The pressure relief valve as defined in claim 1, wherein the tubular means includes at least one opening in the wall thereof, the opening providing restrictive flow means to bypass a predetermined amount of fluid when said planar portion overlays and engages the valve seat.

3. The pressure relief valve as defined in claim 2, wherein each said opening comprises a notch in the valve seat.

4. The pressure relief valve as defined in claim 1, wherein said spring means includes a controllable tension spring having one end engaging said planar portion and the other end engaging the valve housing whereby the spring is compressed as said planar portion separates from the valve seat.

5. The pressure relief valve as defined in claim 4, further comprising a member threadedly engaging said valve housing, the other end of said spring engaging said threaded member whereby said threaded member may be adjusted to control the tension of the spring.

6. The pressure relief valve as defined in claim 1, wherein said stop means threadedly engages the valve housing and extends towards said planar portion, whereby said stop means may be adjusted to control the maximum allowable movement of said planar portion away from said valve seat.

* * * * *